US007127392B1

(12) United States Patent
Smith

(10) Patent No.: US 7,127,392 B1
(45) Date of Patent: Oct. 24, 2006

(54) DEVICE FOR AND METHOD OF DETECTING VOICE ACTIVITY

(75) Inventor: David C. Smith, Columbia, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 878 days.

(21) Appl. No.: 10/370,309

(22) Filed: Feb. 12, 2003

(51) Int. Cl.
*G10L 15/20* (2006.01)

(52) U.S. Cl. ...................... 704/233; 704/214; 704/208; 704/215

(58) Field of Classification Search ................ 704/214, 704/204, 210, 213, 215, 216, 219, 217, 500, 704/233
See application file for complete search history.

(56) References Cited

U.S. PATENT DOCUMENTS 5,619,565 A 4/1997 Cesaro et al.
6,023,674 A 2/2000 Mekuria
6,182,035 B1 1/2001 Mekuria
6,249,757 B1 * 6/2001 Cason ........................ 704/214
2002/0103636 A1 8/2002 Tucker et al.
2002/0147580 A1 10/2002 Mekuria et al.

OTHER PUBLICATIONS

D. Smith et al., "A Multivariate Speech Activity Detector Based on the Syllable Rate", Proceedings of SPIE, vol. 3461, pp. 68-78, 1998.
D. Smith et al., "A Multivariate Speech Activity Detector Based on the Syllable Rate", Proceedings of ICASSP, vol. 1, pp. 73-76, 1999.

* cited by examiner

*Primary Examiner*—Richemond Dorvil
*Assistant Examiner*—Huyen X. Vo
(74) *Attorney, Agent, or Firm*—Robert D. Morelli

(57) ABSTRACT

The present invention is a device for and method of detecting voice activity. First, the AM envelope of a segment of a signal of interest is determined. Next, the number of times the AM envelope crosses a user-definable threshold is determined. If there are no crossings, the segment is identified as non-speech. next, the number of points on the AM envelope within a user-definable range is determined. If there are less than a user-definable number of points within the range, the segment is identified as non-speech. Next, the mean, variance, and power ratio of the normalized spectral content of the AM envelope is found and compared to the same for known speech and non-speech. The segment is identified as being of the same type as the known speech or non-speech to which it most closely compares. These steps are repreated for each signal segment of interest.

14 Claims, 2 Drawing Sheets

DEVICE FOR AND METHOD OF DETECTING VOICE ACTIVITY

FIELD OF THE INVENTION

The present invention relates, in general, to data processing and, in particular, to speech signal processing for identifying voice activity.

BACKGROUND OF THE INVENTION

A voice activity detector is useful for discriminating between speech and non-speech (e.g., fax, modem, music, static, dial tones). Such discrimination is useful for detecting speech in a noisy environment, compressing a signal by discarding non-speech, controlling communication devices that only allow one person at a time to speak (i.e., half-duplex mode), and so on.

A voice activity detector may be optimized for accuracy, speed, or some compromise between the two. Accuracy often means maximizing the rate at which speech is identified as speech and minimizing the rate at which non-speech is identified as speech. Speed is how much time it takes a voice activity detector to determine if a signal is speech or non-speech. Accuracy and speed work against each other. The most accurate voice activity detectors are often the slowest because they analyze a large number of features of the signal using computationally complex methods. The fastest voice activity detectors are often the least accurate because they analyze a small number of features of the signal using computationally simple methods. The primary goal of the present invention is accuracy.

Many prior art voice activity detectors only do a good job of distinguishing speech from one type of non-speech using one type of discriminator and do not do as well if a different type of non-speech is present. For example, the variance of the delta spectrum magnitude is an excellent discriminator of speech vs. music but it not a very good discriminator of speech vs. modem signals or speech vs. tones. Blind combination of specific discriminators does not lead to a general solution of speech vs. non-speech. A dimension reduction technique such as principal components reduction may be used when a large number of discriminators are analyzed in an attempt to compress the data according to signal variance. Unfortunately, maximizing variance may not provide good discrimination.

Over the past few years, several voice activity detectors have been in use. The first of these is a simple energy detection method, which detects increases in signal energy in voice grade channels. When the energy exceeds a threshold, a signal is declared to be present. By requiring that the variance of the energy distribution also exceed a threshold, the method may be used to distinguish speech from several types of non-speech.

In two articles, both entitled "A multivariate speech activity detector based on the syllable rate," *Proceeding of SPIE*, Vol. 3461, pp. 68–78, 1998, and *Proceeding of ICASSP*, Vol. 1, pp. 73–76, 1999, Dr. David Smith et al. disclose a method of detecting voice by squaring the absolute value of a signal segment, finding the AM envelope of the signal segment, determining whether or not the AM envelope crosses a user-definable threshold, subtracting a mean of the AM envelope from the AM envelope, padding the result with zeros to make the result a power of two if necessary, finding the spectral components of the AM envelope, finding a normalized vector of the spectral components, and comparing the result to empirical models of speech and non-speech. The present invention is an improvement upon the method disclosed in these articles.

U.S. Pat. No. 5,619,565, entitled "VOICE ACTIVITY DETECTION METHOD AND APPARATUS USING THE SAME," discloses a device for and method of detecting voice, a single tone, and a dual tone by squaring a maximum value of a received signal, dividing the result by a measure of energy and comparing the ration to three threshold that represent voice, a single tone, and a dual tone, respectively. The present invention does not employ either the device or the method of U.S. Pat. No. 5,619,565. U.S. Pat. No. 5,619,565 is hereby incorporated by reference into the specification of the present invention.

U.S. Pat. No. 6,023,674, entitled "NON-PARAMETRIC VOICE ACTIVITY DETECTION," discloses a device for and method of detecting voice activity by extracting pitch period and signal energy information from an audio signal. The present invention does not employ either the device or the method of U.S. Pat. No. 6,023,674. U.S. Pat. No. 6,023,674 is hereby incorporated by reference into the specification of the present invention.

U.S. Pat. No. 6,182,035, entitled "METHOD AND APPARATUS FOR DETECTING VOICE ACTIVITY," discloses a device for and method of detecting voice activity using wavelet transformation. The present invention does not use wavelet transformation to detect voice activity. U.S. Pat. No. 6,182,035 is hereby incorporated by reference into the specification of the present invention.

U.S. Pat. No. 6,249,757, entitled "SYSTEM FOR DETECTING VOICE ACTIVITY," discloses a device for and method of detecting voice activity using two nonlinear filters, where one of the filter has a low time constant, and where the other filter has a high time constant. The present invention does not use two filters with differing time constants to detect voice activity. U.S. Pat. No. 6,249,757 is hereby incorporated by reference into the specification of the present invention.

U.S. Pat. Appl. No. 2002/0103636, entitled "FREQUENCY-DOMAIN POST-FILTERING VOICE-ACTIVITY DETECTOR," discloses a device for and method of detecting voice activity by taking a currently received set of audio samples and a previously received set of audio samples in the time domain, converts the time-domain samples to the frequency domain, weights the energies of frequency ranges of the remaining frequencies proportionately to their frequencies, computes the total power of the ranges, and compares the power peaks to a threshold. The present invention does not weight the energies of frequency ranges to detect voice activity. U.S. Pat. Appl. No. 2002/0103636 is hereby incorporated by reference into the specification of the present invention.

U.S. Pat. Appl. No. 2002/0147580, entitled "REDUCED COMPLEXITY VOICE ACTIVITY DETECTOR," discloses a device for and method of detecting voice activity by processing an audio signal to produce a train of signal samples, identifying signal peaks, computing values for quasi-pitch periods associated with the signal sample train, and selectively comparing the quasi-pitch periods with one another to determine the presence or absence of a speech component. The present invention does not produce and compare quasi-pitch periods to detect voice activity. U.S. Pat. Appl. No. 2002/0147580 is hereby incorporated by reference into the specification of the present invention.

SUMMARY OF THE INVENTION

It is an object of the present invention to detect voice activity in a signal.

It is another object of the present invention to detect voice activity by in a manner than includes determining if the number of points on an AM envelope of a signal segment is within a user-definable range based on a mean value and maximum value of the AM envelope are above a user-definable threshold.

The present invention is a device for and method of detecting voice activity.

The device of the present invention implements the following method.

The first step of the method is receiving a signal.

The second step of the method is extracting a user-definable segment from the signal.

The third step of the method is finding the absolute value of the signal segment.

The fourth step of the method is squaring the absolute value.

The fifth step of the method is finding the Amplitude Modulation (AM) envelope of the signal segment.

The sixth step of the method is finding the mean value of the AM envelope.

The seventh step of the method is finding the number of times the AM envelope crosses a first user-definable threshold.

If the AM envelope doesn't cross the first user-definable threshold then the eighth step of the method is declaring the signal segment to be non-speech, returning to the second step if additional segments of the signal are to be processed, and stopping if there are no other signal segments to be processed. Otherwise, proceeding to the next step.

The ninth step of the method is finding the maximum value of the AM envelope.

The tenth step of the method is finding the number of points on the AM envelope within a user-definable range based on the mean and the maximum values of the AM envelope.

If N is less than a second user-definable threshold then the eleventh step of the method is declaring the signal segment to be non-speech, returning to the second step if there are additional signal segments to be processed, and stopping if there are no other signal segments to be processed. Otherwise, proceeding to the next step.

The twelfth step of the method is subtracting the mean value of the AM envelope from the AM envelope.

If the result of the last step is not a power of two then the thirteenth step of the method is padding the result of the last step so that it is a power of two. Otherwise, proceeding to the next step.

The fourteenth step of the method is finding the spectral content of the AM envelope.

The fifteenth step of the method is computing a normalized vector of the magnitude of the spectral content of the AM envelope.

The sixteenth step of the method is computing a mean, a variance, and a power ratio of the normalized vector.

The seventeenth, and last, step of the method is comparing the result of the last step to empirically-determined models of mean, variance, and power ratio of known speech and non-speech segments and declaring the signal segment to be of the type of the empirically-determined model to which it most closely compares.

DETAILED DESCRIPTION

The present invention is a device for and method of detecting voice activity. It is an improvement over the device and method disclosed in the two papers of Smith et al. disclosed above.

Figure 1:
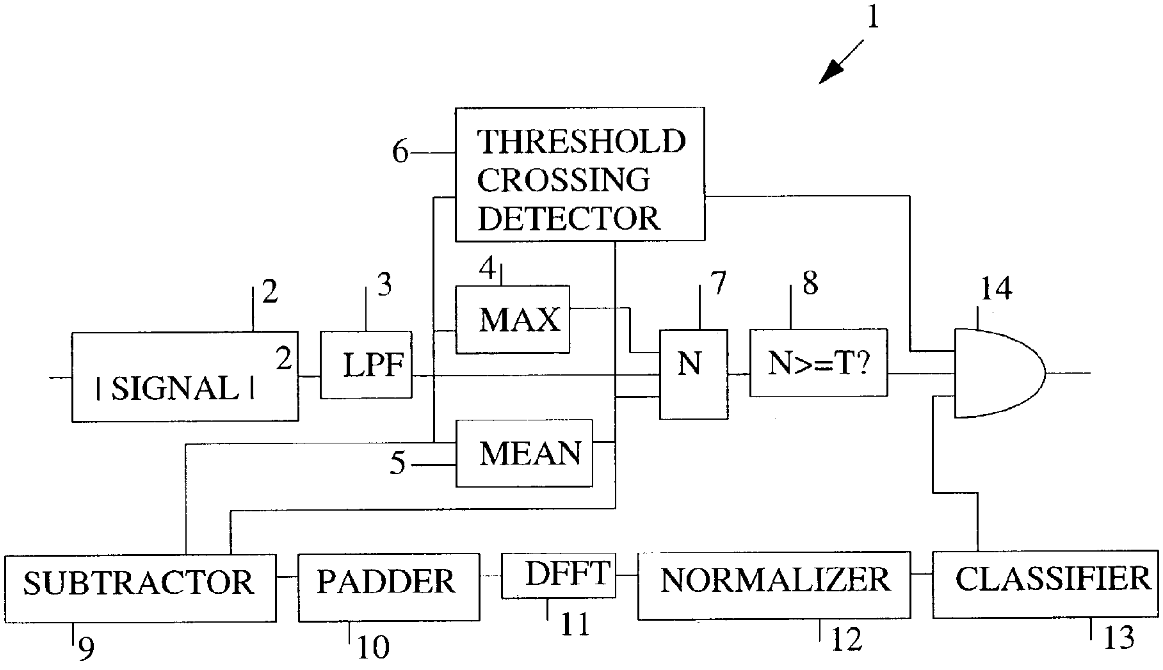
FIG. 1 is a schematic of the present invention.

FIG. 1 is a schematic of the best mode and preferred embodiment of the present invention. The voice activity detector 1 receives a segment of a signal, computes feature vectors from the segment, and determines whether or not the segment is speech or non-speech. In the preferred embodiment, the segment is 0.5 seconds of a signal. In the preferred embodiment, the next segment analyzed is a 0.1 second increment of the previous segment. That is, the next segment includes the last 0.4 seconds of the first segment with an additional 0.1 seconds of the signal. Other segment sizes and increment schemes are possible and are intended to be included in the present invention. However, a segment length of 0.5 seconds was empirically determined to give the best balance between result accuracy and time window needed to resolve the syllable rate of speech.

The voice activity detector 1 receives the segment at an absolute value squarer 2. The absolute value squarer 2 finds the absolute value of the segment and then squares it. An arithmetic logic unit, a digital signal processor, or a microprocessor may be used to realize the function of the absolute value squarer 2.

The absolute value squarer 2 is connected to a low pass filter (LPF) 3. The low pass filter 3 blocks high frequency components of the output of the absolute value squarer 2 and passes low frequency components of the output of the absolute value squarer 2. For speech purposes, low frequency is considered to be less than or equal to 60 Hz since the syllable rate of speech is within this range and, more particularly, within the range of 0 Hz to 10 Hz. The low pass filter 3 removes unnecessary high frequency components and simplifies subsequent computations. In the preferred embodiment, the low pass filter 3 is realized using a Hanning window. The output of the low pass filter 3 is often referred to as an Amplitude Modulated (AM) envelope of the original signal. This is because the high frequency, or rapidly oscillating, components have been removed, leaving only an AM envelope of the original segment.

The low pass filter 3 is connected to a first function block 4 for determining the maximum value of the AM envelope (MAX), a second function block 5 for determining the mean value of the AM envelope (MEAN), and a threshold-crossing detector 6. An arithmetic logic unit, a digital signal processor, or a microprocessor may be used to realize either of the first and second function blocks 4,5.

The output of second function block 5 is connected to the threshold-crossing detector 6. The threshold-crossing detector 6 counts the number of times the AM envelope dips below a first user-definable threshold. In the preferred embodiment, the first user-definable threshold is 0.25 times the mean of the AM envelope. If the segment presented to the threshold-crossing detector 6 does not cross the first user-definable threshold then the segment is identified as non-speech. However, just because the segment crosses the first user-definable threshold does not mean that the segment is speech. Therefore, processing of the segment continues if it crosses the first user-definable threshold. The threshold-crossing detector 6 has an output for indicating whether or the segment is non-speech. If the segment is non-speech then the output of the threshold-crossing detector 6 is a logic zero. Otherwise, the output of the threshold-crossing detector 6 is a logic one. A logic one output does not necessarily indicate that the segment is speech. Additional processing is required to make such a determination.

The outputs of the low-pass filter 3, the first function block 4, and the second function block 5 are connected to a third function block 7 for determining the number of points N on the AM envelope that lie within a user-definable range. In the preferred embodiment, the user-definable range is from 0.25 times the mean of the AM envelope to MAX minus 0.25 times the mean of the AM envelope. An arithmetic logic unit, a digital signal processor, or a microprocessor may be used to realize the third function block 7.

The output of the third function block 7 is connected to a comparator 8 for determining whether or not N is greater than or equal to a second user-definable threshold. In the preferred embodiment the second user-definable threshold is 10. The comparator 8 has an output for indicating whether the segment is non-speech. If the number of points on the AM envelope within the user-definable range is less than the second user-definable threshold then the output of the comparators indicates that the signal segment is non-speech (e.g., a logic zero). Otherwise, the output of the comparator 8 is a logic one. A logic one output does not necessarily indicate that the segment is speech. Additional processing is required to make such a determination.

The first function block 4, the second function block 5, the third function block 7, and the comparator 8 represents the improvement over the device and method described by Smith et al. in the two articles described above. The improvement results in a speech activity detector that is more accurate than the one disclose by Smith et al. above.

The outputs of the low-pass filter 3 and the second function block 5 are connected to a subtractor 9. The subtractor 9 receives the AM envelope of the segment and the mean of the AM envelope and subtracts the mean of the AM envelope from the AM envelope. Mean subtraction improves the ability of the voice activity detector 1 to discriminate between speech and certain modem signals and tones. The subtractor 9 may be realized by an arithmetic logic unit, a digital signal processor, or a microprocessor.

The subtractor 9 is connected to a padder 10. If the output of the subtractor 9 is not a power of two, the padder 10 pads the output of the subtractor 9 with zeros so that the result is a power of two. In the preferred embodiment, eight bit values are used as a compromise between accuracy of resolving frequencies and the desire to minimize computation complexity. The padder 10 may be realized with a storage register and a counter.

The padder 10 is connected to a Digital Fast Fourier Transformer (DFFT) 11. The DFFT 11 performs a Digital Fast Fourier Transform on the output of the padder 10 to obtain the spectral, or frequency, content of the AM envelope. It is expected that there will be a peak in the magnitude of the speech signal spectral components in the 0–10 Hz range, while the magnitude of the non-speech signal spectral components in the same range will be small. The present invention establishes a spectral difference between speech signal and non-speech signal spectral components in the syllable rate range.

The DFFT 11 is connected to a normalizer 12. The normalizer 12 computes the normalized vector of the magnitude of the DFFT of the AM envelope, computes the mean of the normalized vector, computes the variance of the normalized vector, and computes the power ratio of the normalized vector. A normalized vector of a magnitude spectrum consists of the magnitude spectrum divided by the sum of all of the components of the magnitude spectrum. The normalized vector is a vector whose components are non-negative and sum to one. Therefore, the normalized vector may be viewed as a probability density. The power ratio of the normalized vector is found by first determining the average of the components in the normalized vector and then dividing the largest component in the normalized vector by this average. The result of the division is the power ratio of the normalized vector. The mean, variance, and power ratio of the normalized vector constitutes the feature vector of the segment received by the voice activity detector 1. The normalizer 12 may be realized by an arithmetic logic unit, a microprocessor, or a digital signal processor.

The normalizer 12 is connected to a classifier 13. The classifier 13 receives the mean, variance, and power ratio of the segment computed by the normalizer 12 and compares it to precomputed models which represent the mean, variance, and power ratio of known speech and non-speech segments. The classifier 13 declares the feature vector of the segment to be of the type (i.e., speech or non-speech) of the precomputed model to which it matches most closely. Various classification methods are known by those skilled in the art. In the preferred embodiment, the classifier 13 performs the classification method of Quadratic Discriminant Analysis. The classifier 13 may determine whether the received segment is speech or non-speech based on the segment received or the classifier 13 may retain a number of, preferably five, consecutive 0.5 second segments and use them as votes to determine whether the 0.1 second interval common to these segments is speech or non-speech. Voting permits a decision every 0.1 seconds after the first number of frames are processed and improves decision accuracy. Therefore, voting is used in the preferred embodiment. The classifier 13 may be realized with an arithmetic logic unit, a microprocessor, or a digital signal processor.

The outputs of the classifier 13, the threshold-crossing detector 6, and the comparator 8 are connected to decision logic block 14 for determining whether the segment is speech or non-speech. In the preferred embodiment, the decision logic block 14 is an AND gate. That is, the threshold-detector 6, the comparator 8, and the classifier 13 each put out a logic one value to indicate speech and a logic zero value to indicate non-speech. So, a logic one value from each of the threshold-crossing detector 6, the comparator 8, and the classifier 13 is required to indicate that the segment is speech. However, a logic zero value from either the threshold-crossing detector 6, the comparator 8, or the classifier 13 would indicate that the segment is non-speech.

Figure 2:
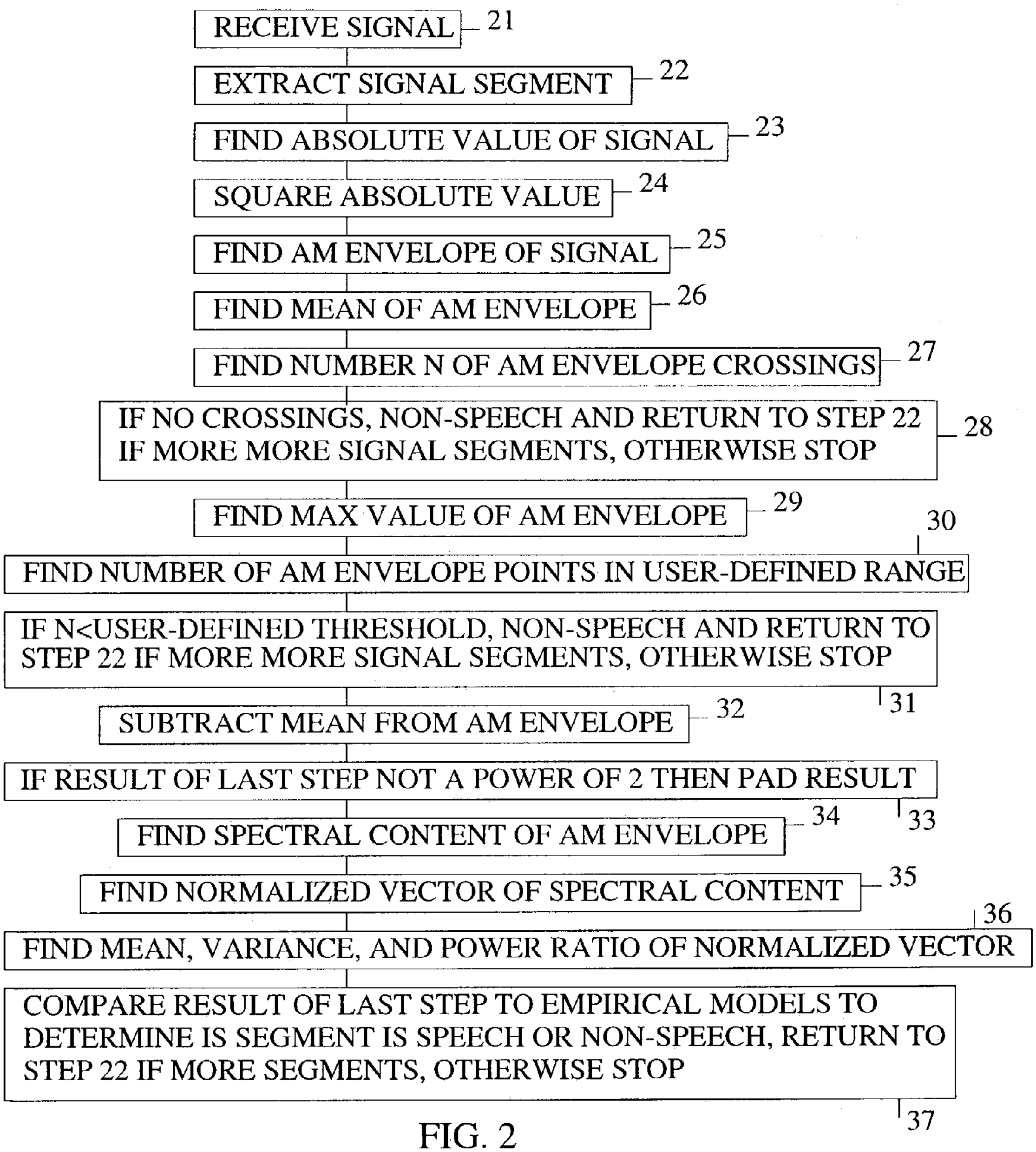
FIG. 2 is a list of steps of the present invention.

FIG. 2 is a list of steps of the method of the present invention.

The first step 21 of the method is receiving a signal.

The second step 22 of the method is extracting a user-definable segment from the signal. In the preferred embodiment, the segment is 0.5 seconds in length. A subsequent segment overlaps the most recent previous segment. In the preferred embodiment, a subsequent segment overlaps the most recent previous segment by 0.4 seconds so that the new part of the segment is only 0.1 seconds in length. In an alternate embodiment, the signal segments processed are retained as consecutive frames The frames (e.g., 5 frames) are then used as votes to determine whether the 0.1 second interval common to the number of consecutive 0.5 second frames is speech or non-speech.

The third step 23 of the method is finding the absolute value of the signal segment.

The fourth step 24 of the method is squaring the absolute value.

The fifth step 25 of the method is finding the Amplitude Modulation (AM) envelope of the signal segment. In the preferred embodiment, the AM envelope is found by low-pass filtering the segment.

The sixth step 26 of the method is finding the mean value of the/AM envelope.

The seventh step 27 of the method is finding the number of times the AM envelope crosses a first user-definable threshold. In the preferred embodiment, the first user-definable threshold is 0.25 times the mean of the AM envelope.

If the AM envelope doesn't cross the first user-definable threshold then the eighth step 28 of the method is declaring the signal segment to be non-speech, returning to the second step 22 if additional segments of the signal are to be processed, and stopping if there are no other signal segments to be processed. Otherwise, proceeding to the next step.

The ninth step 29 of the method is finding the maximum value (MAX) of the AM envelope.

The tenth step 30 of the method is finding the number of points N on the AM envelope within a user-definable range based on the mean and maximum values of the AM envelope. In the preferred embodiment, the user-definable range is from 0.25 times the mean value to MAX minus 0.25 times the mean value.

If N is less than a second user-definable threshold then the eleventh step 31 of the method is declaring the signal segment to be non-speech, returning to the second step 22 if there are additional signal segments to be processed, and stopping if there are no other signal segments to be processed. Otherwise, proceeding to the next step. In the preferred embodiment, the second user-definable threshold is 10.

The twelfth step 32 of the method is subtracting the mean value of the AM envelope from the AM envelope.

If the result of the last step is not a power of two then the thirteenth step 33 of the method is padding the result of the last step so that it is a power of two. Otherwise, proceeding to the next step. In the preferred embodiment, the result of the last step is padded with zeros if necessary.

The fourteenth step 34 of the method is finding the spectral content of the AM envelope. In the preferred embodiment, spectral content is found by performing a Digital Fast Fourier Transform (DFFT).

The fifteenth step 35 of the method is computing a normalized vector of the magnitude of the spectral content of the AM envelope.

The sixteenth step 36 of the method is computing a mean, a variance, and a power ratio of the normalized vector.

The seventeenth, and last, step 37 of the method is comparing the result of the last step to empirically-determined models of mean, variance, and power ratio of known speech and non-speech segments and declaring the signal segment to be of the type of the empirically-determined model to which it most closely compares. In the preferred embodiment, the seventeenth step 37 of the method is conducted by performing a Quadratic Discriminant Analysis

What is claimed is:

1. A voice activity detector, comprising:

a) an absolute value squarer, having an input for receiving a signal, and having an output;

b) a low-pass filter, having an input connected to the output of said absolute value squarer, and having an output;

c) a first function block for finding a mean value, having an input connected to the output of the low pass-filter, and having an output;

d) a second function block for finding a maximum value, having an input connected to the output of the low-pass filter, and having an output;

e) a threshold-crossing detector, including a first user-definable threshold, having an input connected to the output of the low pass filter, and having an output;

f) a third function block for finding a number of points between a user-definable range, having a first input connected to the output of the low-pass filter, having a second input connected to the output of the first function block, having a third input connected to the output of the second function block, and having an output;

g) a comparator, having an input connected to the output of the third function block, and including a second user-definable threshold to which to compare;

h) a subtractor, having a first input connected to the output of the low pass filter, having a second input connected to the output of the second function block, and having an output;

i) a padder, having an input connected to the output of the subtractor, and having an output;

j) a Digital Fast Fourier Transformer, having an input connected to the output of the padder, and having an output;

k) a normalizer, having an input connected to the output of the Digital Fast Fourier Transformer, and having an output;

l) a classifier, having an input connected to the output of the normalizer, and having an output; and m) a decision-logic block, having a first input connected to the output of the threshold-crossing detector, having a second input connected to the output of the comparator, having a third input connected to the output of the classifier, and having an output.

2. The voice activity detector of claim 1, wherein the threshold-crossing detector includes a first user-definable threshold that is 0.25 times the mean value of the output of the low-pass filter.

3. The voice activity detector of claim 1, wherein the third function block includes a user-definable range from 0.25 times the mean value of the output of the low-pass filter to the maximum value of the low-pass filter minus 0.25 times the mean value of the low-pass filter.

4. The voice activity detector of claim 1, wherein the comparator includes 10 as the second user-definable threshold.

5. A method of detecting voice activity detector, comprising the steps of:

a) receiving a signal;

b) extracting a segment from the signal;

c) computing an absolute value of the signal segment;

d) squaring the result of the last step;

e) finding an Amplitude Modulation (AM) envelope of the result of the last step;

f) computing the mean of the last step;

g) finding a first number of times the AM envelope crosses a first user-definable threshold;

h) if the result of the last step is zero, identifying the signal segment as non-speech and returning to step (b) if there are more signal segments to process, otherwise stopping;

i) finding the maximum value of the AM envelope;

j) finding a second number points on the AM envelope that are within a user-definable range;

k) if the result of the last step is less than a second user-definable threshold then identifying the signal segment as non-speech and returning to step (b) if there are more signal segments to process, otherwise stopping;

l) subtracting the mean value of the AM envelope from the AM envelope;

m) if the result of the last step is not a power of two then padding the result of the last step to form the next highest power of two;

n) finding the spectral content of the AM envelope;

o) finding a normalized vector of the result of the last step;

p) computing a mean, variance, and power ratio of the result of the last step; and q) comparing the results of the last step to means, variances, and power ratios of known speech and non-speech, identifying the signal segment as a type to which they most closely compare, and returning to step (b) is there are more signal segments to process.

6. The method of claim 5, wherein the step of extracting a signal segment is comprised of the step of extracting a 0.5 second segment from the signal, where the signal segment overlaps a most resent previous signal segment by 0.4 seconds.

7. The method of claim 6, further including the steps of:

a) retaining a number of consecutive 0.5 second frames; and b) using the number of consecutive 0.5 second frames as votes to determine whether the 0.1 second interval common to the number of consecutive 0.5 second frames is speech or non-speech.

8. The method of claim 7, wherein said step of retaining a number of consecutive 0.5 second frames is comprised of the step of retaining five consecutive 0.5 second frames.

9. The method of claim 5, wherein said step of finding a first number of times the AM envelope crosses a first user-definable threshold is comprised of finding a first number of times the AM envelope crosses 0.25 times the mean of the AM envelope.

10. The method of claim 5, wherein the step of finding a second number points on the AM envelope that are within a user-definable range is comprised of the step of finding a second number points on the AM envelope that are within 0.25 times the mean value and the maximum value minus 0.25 times the mean value.

11. The method of claim 5, wherein the step of identifying the signal segment as non-speech if the result of the last step is less than a second user-definable threshold is comprised of identifying the signal segment as non-speech if the result of the last step is less than 10.

12. The method of claim 5, wherein the step of padding the result of the last step to form the next highest power of two is comprised of the step of padding the result of the last step with zeros to form the next highest power of two.

13. The method of claim 5, wherein the step of finding the spectral content of the AM envelope is comprised of the step of performing a Digital Fast Fourier Transform.

14. The method of claim 5, wherein the step of comparing the results of the last step to means, variances, and power ratios of known speech and non-speech is comprised of the step of performing a Quadratic Discriminant Analysis.

* * * * *